United States Patent [19]

Webster

[11] 4,111,321

[45] Sep. 5, 1978

[54] MECHANISMS FOR LOADING AND UNLOADING CONTAINERS ONTO AND FROM A VEHICLE

[75] Inventor: Raymond George Webster, Bolton, England

[73] Assignee: Edbro Limited, Lancashire, England

[21] Appl. No.: 755,469

[22] Filed: Dec. 30, 1976

[30] Foreign Application Priority Data

Jan. 9, 1976 [GB] United Kingdom .................. 872/76

[51] Int. Cl.² .............................................. B60P 1/14
[52] U.S. Cl. ..................................... 214/501; 298/12
[58] Field of Search .................... 214/501, 515, 77 R, 214/146.5, 505; 298/12

[56] References Cited

U.S. PATENT DOCUMENTS

| 3,819,075 | 6/1974 | Derain | 214/515 |
| 3,874,537 | 4/1975 | Kou | 214/501 |
| 3,892,323 | 7/1975 | Corompt | 214/515 |
| 3,942,664 | 3/1976 | Lemaire | 214/515 |
| 3,988,035 | 10/1976 | Corompt | 214/515 |

FOREIGN PATENT DOCUMENTS

| 2,231,601 | 12/1974 | France | 214/515 |
| 2,458,811 | 6/1975 | Fed. Rep. of Germany | 214/515 |

Primary Examiner—Drayton E. Hoffman
Assistant Examiner—Lawrence E. Williams
Attorney, Agent, or Firm—Birch, Stewart, Kolasch and Birch

[57] ABSTRACT

A mechanism for loading and unloading a container onto and from a vehicle comprises a member having one end thereof for releasable connection to the container and the other end thereof carrying pivot means movable in an elongated guide means for connection to the vehicle. The guide means so guide the pivot means so that a first actuator means, which acts on the pivot means, is operable to move the pivot means in, and relatively to, the guide means to move the member and the pivot means from a loaded position to an unloading position. A second actuator means which acts on the member is operable, with the member and the pivot means in the unloading position, to pivot the member relative to the guide means about the pivot means. The member, in moving from the loaded position to the unloading position, moves the container from a position in which the container is mounted on the vehicle for transport thereby to such position that, as the member pivots from the unloading position, the member lifts and unloads the container from the vehicle, the operation of the first and second actuator means being reversible to load the container onto the vehicle.

22 Claims, 9 Drawing Figures

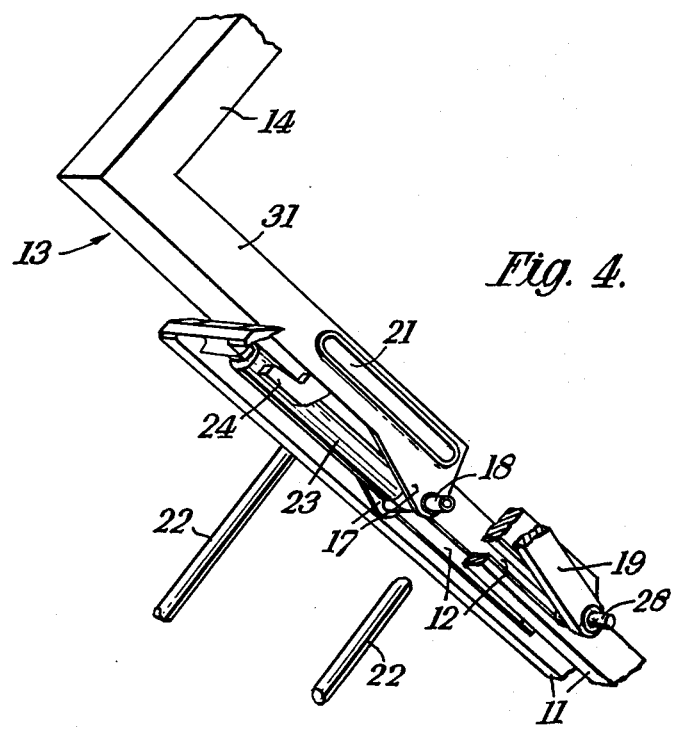
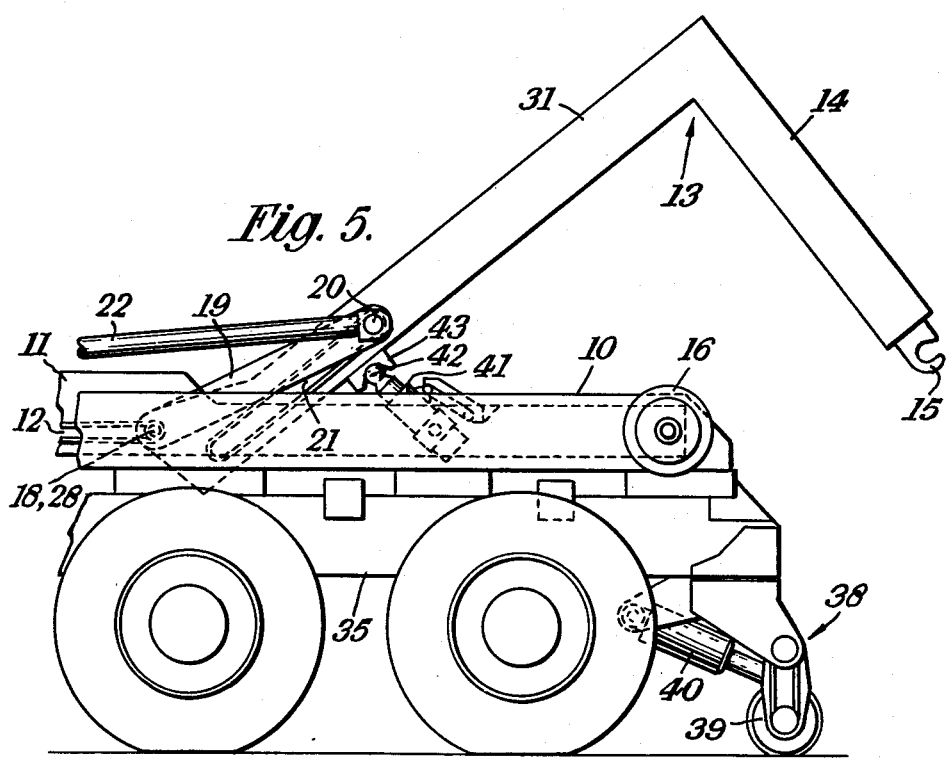

ic4,111,321

MECHANISMS FOR LOADING AND UNLOADING CONTAINERS ONTO AND FROM A VEHICLE

SUMMARY OF THE INVENTION

Field of the Invention

The invention relates to mechanisms for loading and unloading a container onto and from a vehicle.

According to a first aspect of the invention there is provided a mechanism for loading and unloading a container onto and from a vehicle. The mechanism comprising a member having one end thereof for releasable connection to the container and the other end thereof carrying pivot means movable in an elongated guide means for connection to the vehicle. The guide means so guiding the pivot means that a first actuator means, which acts on the pivot means, is operable to move the pivot means in, and relatively to, the guide means to move the member and the pivot means from a loaded position to an unloading position. A second actuator means which acts on the member is operable, with the member and the pivot means in the unloading position, to pivot the member relatively to the guide means about the pivot means whereby, in use, the member, in moving from the loaded position to the unloading position, moves the container from a position in which the container is mounted on the vehicle for transport thereby to such a position that, as the member pivots from the unloading position, the member lifts and unloads the container from the vehicle. The operation of the first and second actuator means being reversible to load the container onto the vehicle.

According to the second aspect of the invention, there is provided a vehicle including a load carrying chassis having mounted thereon a mechanism according to the first aspect of the invention.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a perspective view of a part of the mechanism shown in FIG. 1, partly broken away and in the same position as that shown in FIG. 3;

FIG. 5 is a side elevation of a part of a vehicle having mounted on a load bearing chassis thereof a modified form of the mechanism shown in FIGS. 1 to 4, and FIGS. 6 to 9 are four side elevations of a vehicle having mounted on a load bearing chassis thereof the mechanism shown in FIGS. 1 to 4, the Figures showing four successive stages in the unloading of a container from the vehicle.

DETAILED DESCRIPTION OF THE INVENTION

Figure 1:
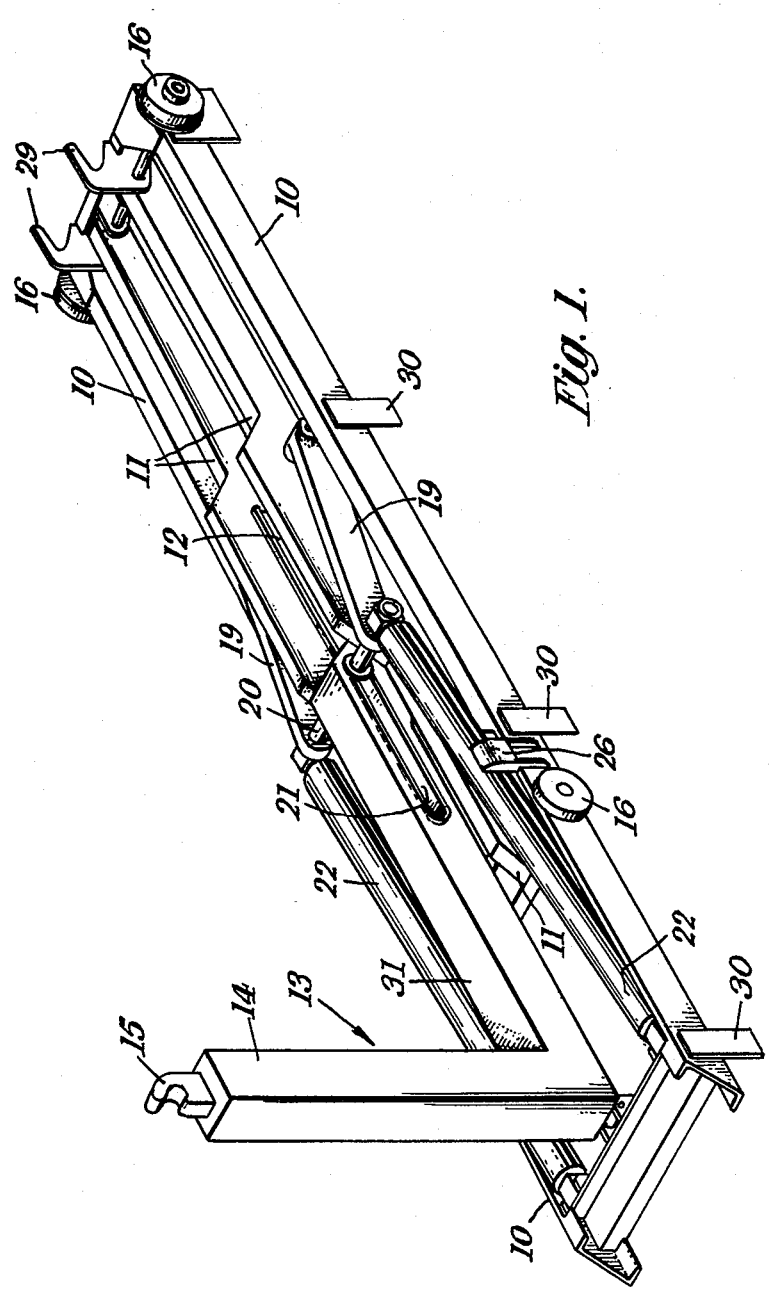
FIG. 1 is a perspective view of a mechanism for loading and unloading a container onto and from a vehicle, the mechanism being in a forward position.
Figure 2:
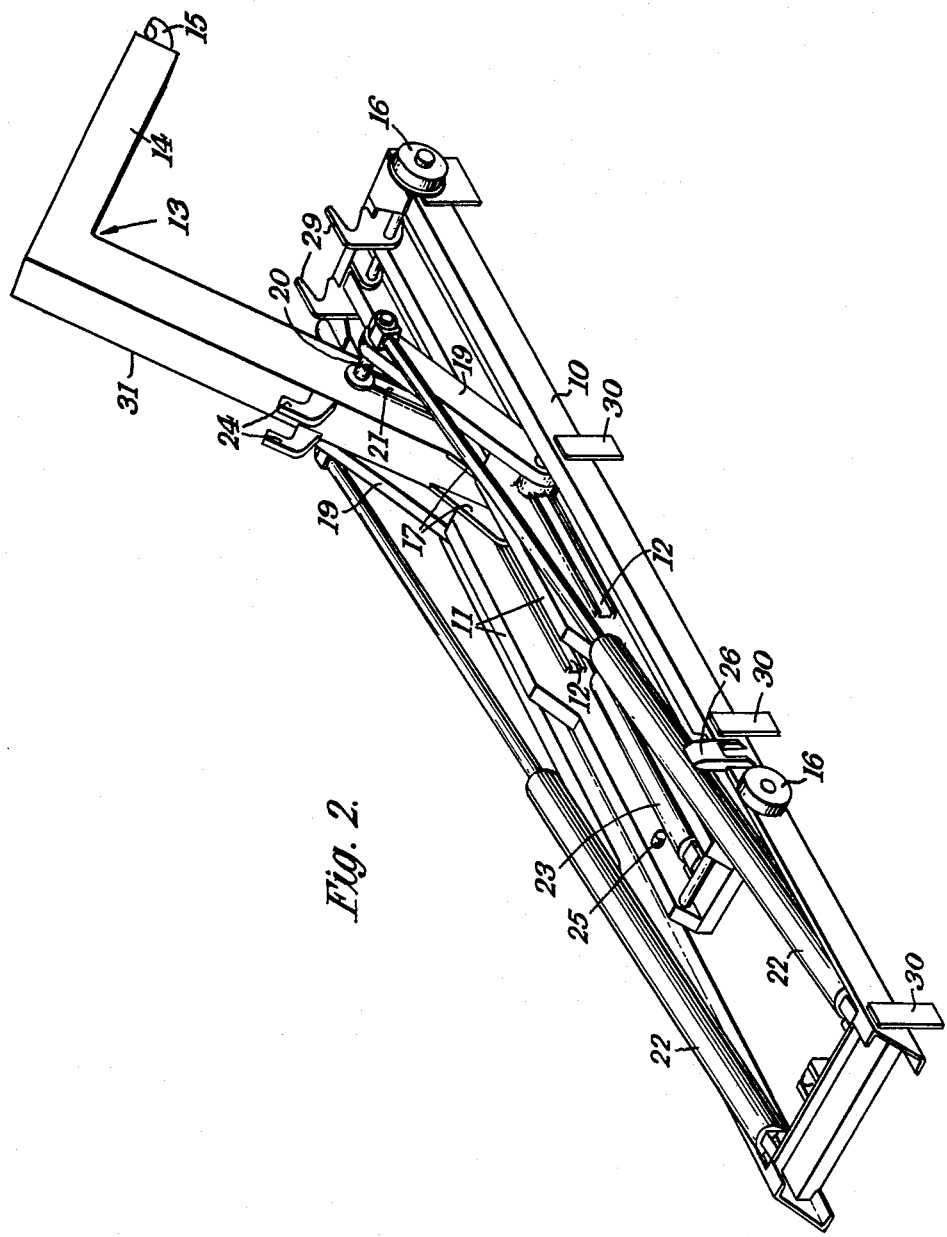
FIG. 2 is a perspective view of the mechanism shown in FIG. 1 in a position in which the container may be unloaded from the vehicle.

Referring first to FIGS. 1 to 4 and 6, the mechanism comprises a rectangular frame 10 which is mounted on the load carrying chassis 35 of a vehicle 36 (see FIG. 6) by lugs 30. A pair of beams 11 are pivoted on the frame 10 at the end thereof which is towards the rear of the vehicle 36. As best seen in FIG. 2 each beam 11 is formed with an elongated guide 12, with the two guides 12 mutually parallel and parallel to the plane of the frame 10.

A box beam member 13 has two connected limbs mutually inclined at right angles. The first, upstanding, limb 14 has a hook 15 at its free end which engages with a container 37. The container 37, in the position shown in FIG. 6, overlies the mechanism and is supported by rollers 16 on the frame 10. The second limb 31 is formed with two depending ears 17, as best seen in FIGS. 2 and 4, which carry projections 18 formed by the ends of a bar and guided in the guides 12.

Each of a pair of links 19 has one end pivotally mounted on a corresponding one of the beams 11 with the pivot point adjacent the rearward end of the associated guide 12. Each link extends upwardly from the beam 11. An opposite end of each link 19 carries one end of a rod 20 which extends through an elongated guide slot 21 in the second limb 31. The slot 21 is parallel to the two guides 12 but spaced upwardly therefrom.

Figure 3:
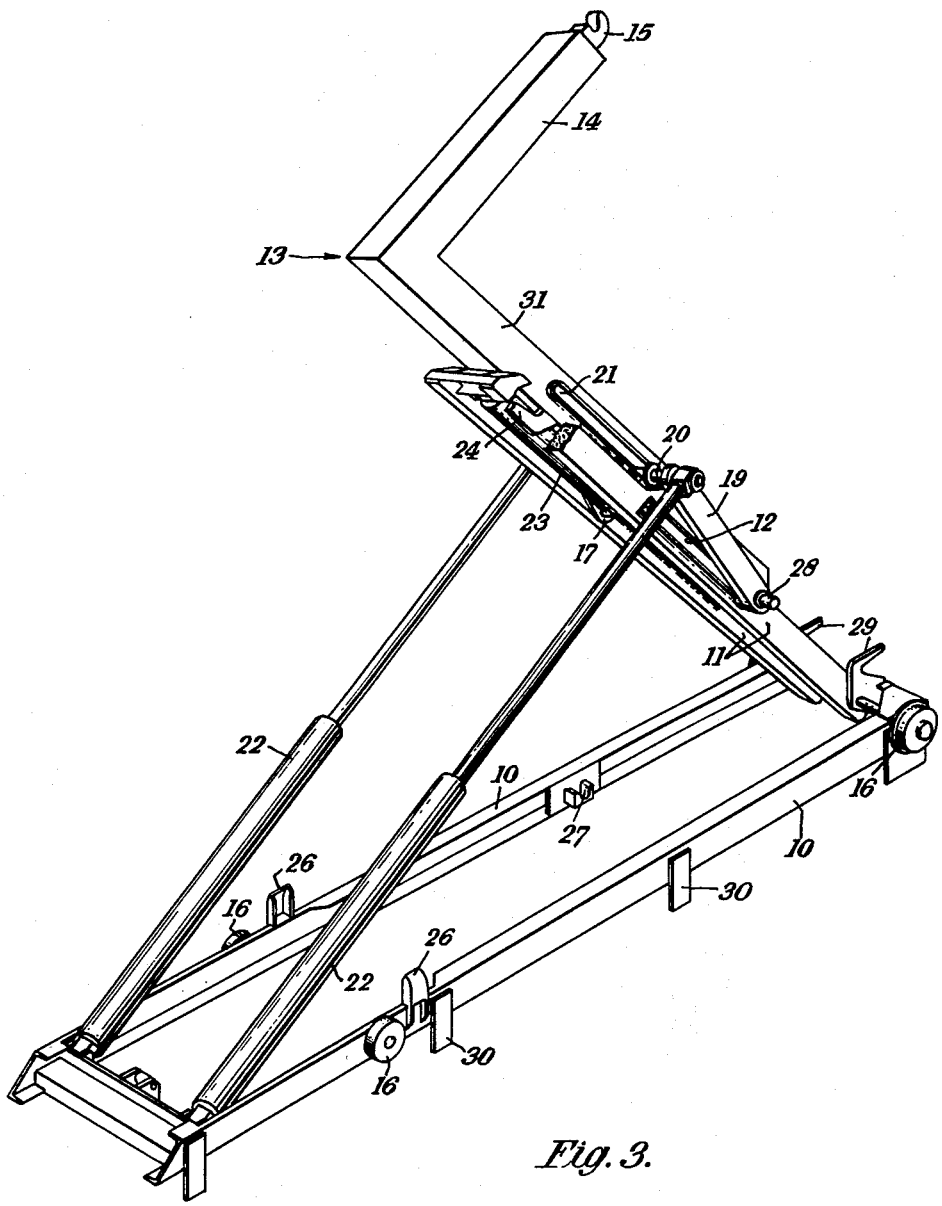
FIG. 3 is a perspective view of the mechanism shown in FIG. 1 in a position in which the container may be tipped.

Two hydraulic rams 22 are connected at one end to the frame 10 and at the other end to the rod 20 at points adjacent the ends of the links 19. A single hydraulic ram 23 (as best seen in FIGS. 2, 3 and 4) is connected between the ends of the beams 11 remote from their pivot point, and to the bar 18 carried by the second limb 31, at a point between the ears 17.

The second limb 31 has two catches 24 (see FIG. 2) which in the position of the mechanism shown in FIG. 1, engage with associated studs, one of which is shown at 25, on the beams 11 to lock the member 13 to the beams 11.

The rod 20 has its axis parallel to the pivot axis of the beams 11 and the pivot axis of the links 19, and these axes are normal to the length of the guides 12. In the position of the mechanism shown in FIG. 1, two plates 26 locate the container transversely and two cups 27 receive pins 28 (see FIG. 3) formed as extensions of the pivots of the links 19 on the beams 11.

Figure 6:
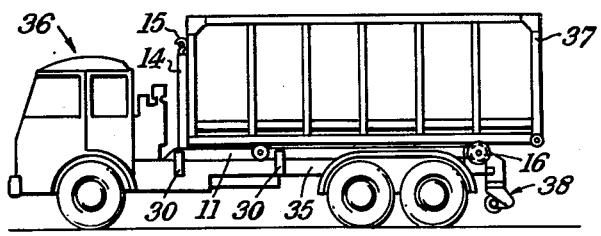

As shown in FIG. 6, the chassis 35 has an extendable and retractable stabilizing jack 38 provided at or towards the rearward end of the vehicle 36. Referring additionally to FIG. 5, the jack 38 comprises a roller assembly 39 pivoted about a horizontal axis for extension and retraction by a hydraulic ram 40.

As mentioned above, in the position of the mechanism shown in FIG. 6, the hook 15 is in engagement with the container 37 which may be of conventional form with a rectangular floor and four walls therearound as shown in FIGS. 6 to 9, or may be a skip or covered container or tank.

Figure 7:
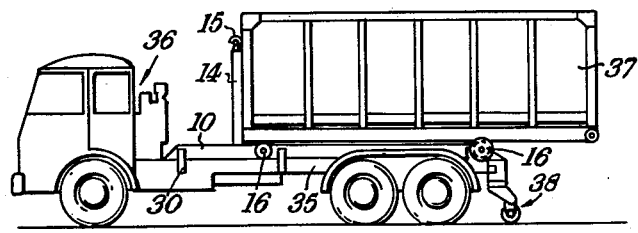
Figure 8:
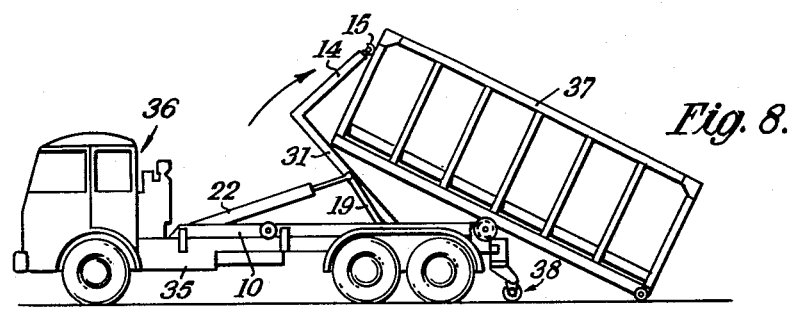
Figure 9:
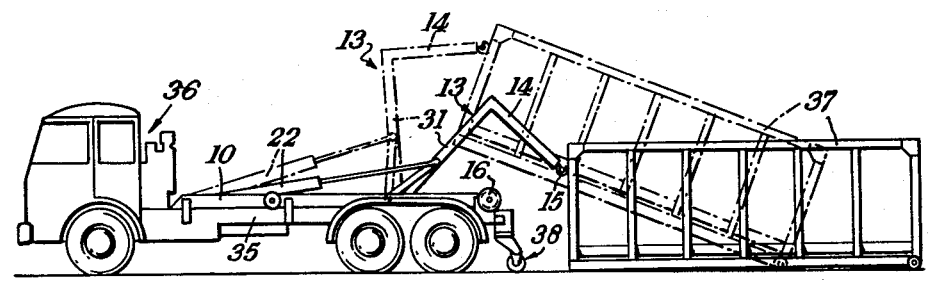

Referring now additionally to FIGS. 6 to 9, if it is desired to unload the container 37 from the vehicle 36, with the mechanism in the loaded position shown in FIGS. 1 and 6, the ram 40 of the jack 38 is actuated to lower the roller assembly 39 to the position shown in FIG. 7 to stabilise the vehicle 36. The single ram 23 is actuated. This ram 23 moves the box-beam member 13 towards the rear of the vehicle 36. As the member 13 commences movement, the catches 24 disengage from the studs 25 but the member 13 is constrained to move in a rectilinear path by the co-operation of the projections 18 with guides 12 and the rod 20 with the slot 21. The container 37 rolls on the rollers 16. This movement continues until the projections 18 reach the ends of the guides 12 and, simultaneously, the rod 20 reaches the end of the slot 21. Any tendency for the vehicle 36 to rotate about its rear wheels is resisted by the jack 38.

In this unloading position, shown in FIG. 7, the projections 18 are co-axial with the pivot axis of the links 19 on the beams 11. In addition, the container overhangs the rear of the vehicle.

The two hydraulic rams 22 are then actuated and because the ears 17 form a depending crank arm, the force applied by the rams 22 rotates the member 13 about the projections 18 while maintaining the position of the beams 11. The rotation of the member 13 pivots the container about the rollers 16 and moves the container from the vehicle until the member 13 reaches the position of FIG. 8 when a rear edge of the container rests on the ground. Continued movement of the rams 22 moves the rear edge of the container 37 along the ground and lowers the container 37 through the position shown in chain-dotted line in FIG. 9 until a base of the container 37 rests on the ground, as shown in full line FIG. 9. The hook 15 is then disengaged from the container by moving the vehicle slightly forward. The member 13 is then returned to the position of FIG. 1 and the jack 38 retracted before the vehicle 36 is driven away.

To load a container 37 onto the vehicle, the vehicle 36 is approximately aligned with the container and the member 13 moved to the position shown in FIG. 2, as described hereinbefore with reference to the drawings. The hook 15 is engaged with the container 37 and action of the two hydraulic rams reversed. As one end of the container 37 leaves the ground, the container 37 will swing into correct alignment with the vehicle with the longitudinal axis of the container 37 parallel to the longitudinal axis of the vehicle 36 so that as the container 37 is hauled onto the vehicle 36 it engages the rollers 16. When the rams 22 have completed their movement, the single ram 23 is actuated to complete the loading of the container 37 onto the vehicle. When loaded, the container 37 engages with slots 29 provided on the frame to stabilize the container 37. Alternatively, the container can remain stationary on the ground and the vehicle be free to move towards the container as the container is lifted onto the vehicle.

If it is desired to tip the container, the two hydraulic rams 22 are actuated with the mechanism in the position shown in FIGS. 1 and 6. The three point engagement between the member 13 and the beams 11 by the projections 18, the rod 20 and links 19 and the catches 24 and studs 25 ensures a rigid assembly which has no tendency to buckle. As the beams 11 pivot, the container is tipped until the rams 22 reach the limit of their movement as shown in FIG. 3. Retraction of the rams 22 returns the container to an untipped position.

Referring next to FIG. 5, there is shown therein a modification to the mechanism for use with large and heavily-loaded containers 37. The modification comprises the addition of an auxiliary hydraulic ram 41 pivotally mounted towards the rear of the vehicle 36 which extends upwardly and forwardly from the chassis 35. A ball 42 is provided at one end of the auxiliary ram 41 and in use this ball 42 engages in a co-operating socket 43, provided on one limb 31 of the member 13, when this member 13 is fully pivoted from the unloading position.

When a filled container 37 is to be loaded on the vehicle 36, the hook 15 is engaged with the container 37, as described above. The rams 22 and the auxiliary ram 41 are then actuated to pivot the member 13 in a return movement to the unloading position. The auxiliary ram at 41 thus aids the rams 22 during that part of the pivotal movement of the member 13 when the lever arm of the rams 22 is the shortest. After an initial return pivoting movement of the member 13 the auxiliary hydraulic ram 41 reaches its full extent and disengages from the member 13 to leave the rams 22 to complete the return of the member 13 to the unloading position. The single ram 23 is then actuated to complete the loading of the container 37 onto the vehicle 36.

The auxiliary hydraulic ram 41 remains extended until the member 13 next pivots from the unloading position, towards the end of this movement the socket 43 contacts the ball 42 and a restrictor valve (not shown) for the auxiliary hydraulic ram 41 restricts the flow of hydraulic fluid from the ram 41 so that the ram 41 aids the rams 22 to control the member 13 during the final pivotal movement of the member 13.

A hydraulic control system (not shown) is preferably provided which when actuation of the single hydraulic ram 23 has commenced prevents actuation of the two hydraulic rams 22, until actuation of the further single ram 23 has ceased. In addition, it prevents actuation of the single hydraulic ram 23 once the two hydraulic rams 22 have commenced tipping the container 37.

It will be appreciated that the slot 21, the links 19 and the rod 20 serve to constrain the member 13 to a rectilinear path. The slot 21 may be so formed as to constrain the member to some other predetermined path. Alternatively, the links 19, slot 21 and rod 20 may be dispensed with. In this lastmentioned case, the two rams will provide some resistance to any tendency of the member to pivot.

It will also be appreciated that the beams 11 and the member 13 can be tipped together without any tendency for pivotal movement therebetween, or 'breaking' as such movement is known.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A mechanism for loading and unloading a container onto and from a vehicle, the mechanism comprising:
    a member having one end thereof adapted for releasable connection to the container;
    pivot means mounted at an end of the member opposite to said one end;
    an elongated guide means adapted to be connected to the vehicle and in which the pivot means is movable;

link means which towards one end thereof is pivotally mounted on the guide means;

second pivot means carried by the link means towards an end thereof opposite said one end of said link means;

a second guide means on the member in which the second pivot means are movable;

a first actuator means acting on the first mentioned pivot means to move the member and the first mentioned pivot means between a loaded position and an unloading position in which the first mentioned pivot means are held against further movement along the guide means with the engagement between the first mentioned pivot means and the first mentioned guide means and the second pivot means and the second guide means constraining the member to a fixed path between the loaded and unloading positions;

a second actuator means which acts on the member and which with the member in the unloading position, is operable to pivot the member about the first mentioned pivot means and the link means about the second pivot means; and whereby the member in moving from the loaded position to the unloading position moves the container from a position in which the container is mounted on the vehicle for transport thereby, to a position in which, as the member in the unloading position is pivoted by the second actuator means, the member lifts and unloads the container from the vehicle, the operation of the first and second actuator means being reversible to load the container onto the vehicle.

2. A mechanism according to claim 1 wherein, the first mentioned guide means so guide the first mentioned pivot means that movement of the first mentioned pivot means to the unloading position comprises movement of the first mentioned pivot means towards a rearward end of the vehicle and wherein, when the member is in the loaded position, the member locks into engagement with the guide means, the guide means being so arranged for pivotal connection towards the rearward end of the vehicle that operation of the second actuator means with the member in the loaded position, pivots the guide means and the member together to tip the container.

3. A mechanism according to claim 1 wherein, in the unloading position of the member, the first mentioned pivot means are coaxial with the pivotal axis of the link means on the first mentioned guide means.

4. A mechanism according to claim 1 wherein, the first mentioned and second guide means are parallel when the member is at or between the loaded and the unloading positions with the axes of the first mentioned and second mentioned pivot means also parallel and normal to the length of said first mentioned and second mentioned guide means so that the predetermined path of the member is a rectilinear path.

5. A mechanism according to claim 1 wherein the first mentioned guide means comprise a pair of parallel elongated guides, the first mentioned means comprising a pair of projections carried by the member, each projection engaging in a corresponding one of the guides.

6. A mechanism according to claim 1 wherein, the guides terminate at one end adjacent the pivot point of the link means on the first mentioned guide means so that when the member is in the unloading position, the projections engage the ends of the guides to provide a pivot axis for the member which is coaxial with the pivotal axis of the link means.

7. A mechanism according to claim 1 wherein, the member comprises an upstanding first limb for connection to the front of the container and a second limb rigidly connected to the first limb and mutually inclined thereto, the second limb carrying the first mentioned pivot means.

8. A mechanism according to claim 7 wherein, the link means comprises a pair of parallel links arranged one on either side of the second limb and pivotally connected at one end thereof to the first mentioned guide means and connected at an opposite end thereof to the second pivot means.

9. A mechanism according to claim 8 wherein, the second guide means comprises a slot in the second limb extending parallel to the first mentioned guide means and wherein the second pivot means comprises a rod extending between opposite ends of the two links and through the slot.

10. A mechanism according to claim 9 wherein, the slot is so arranged that the member reaches the unloading position as the rod engages one end of the slot and that the member reaches the loaded position as the rod engages an opposite end of the slot.

11. A mechanism according to claim 1 wherein, first actuator means comprises a hydraulic ram so connected between the first mentioned guide means and the member that actuation of the hydraulic ram moves the member between the loaded and unloading positions.

12. A mechanism according to claim 1 wherein, the second actuator means comprises a pair of hydraulic rams parallel to one another and parallel to the first mentioned guide means, the rams being so connected between the member and the vehicle, that actuation of the rams with the member in the unloaded position, pivots the member about the first mentioned pivot means to unload a container from the vehicle and, with the member in the loaded position, pivots the first mentioned guide means and the member together about the pivotal axis of the first mentioned guide means to tip the container.

13. A mechanism according to claim 12 wherein, the rams are connected with the link means adjacent the ends thereof carrying the second pivot means and act on the member through the second pivot means.

14. A mechanism according to claim 13 wherein, the point at which the parallel hydralic rams act on the member when the member when the member is in the unloading position is such that there is no tendency for the first mentioned guide means to pivot in the same sense as the member on actuation of the parallel hydralic rams when the member is in this unloading position.

15. A mechanism according to claim 1 wherein, the first mentioned guide means is connected to a frame and the second actuator means is also connected to the frame, the frame being for rigid connection to the vehicle.

16. A mechanism according to claim 15 wherein, the guide means are pivotally mounted on the frame.

17. A mechanism according to claim 15 wherein, the frame is provided with a pair of container engaging members which engage with the container as the member moves from the unloading to the loaded position and, with the arm and container in the loaded position, hold the container on the vehicle.

18. A mechanism according to claim 1 wherein, an auxiliary hydraulic ram is provided one end of which is engaged by the first member at the limit of the pivotal movement of the first member from the unloading position, the auxiliary hydraulic ram being so arranged that when actuated while engaged with the first member at the limit of pivotal movement of the first member away from the unloading position, the auxiliary hydraulic ram extends to pivot the first member in a return movement towards the unloaded position, the auxiliary hydraulic ram disengaging from the first member during said return pivotal movement.

19. A mechanism according to claim 18 wherein, the auxiliary hydraulic ram has a restrictor valve associated therewith, the auxiliary hydraulic ram remaining extended after extension until contacted by the first member during pivotal movement from the unloading position when the auxiliary hydraulic ram is collapsed by the first member, hydraulic fluid from the auxiliary hydraulic ram leaving through said restrictor valve so that the pivotal movement of the first member is controlled thereby.

20. A mechanism according to claim 1, wherein the mechanism is mounted on a vehicle including a load-carrying chassis.

21. A mechanism according to claim 20 wherein, the mechanism is so mounted on the vehicle that the movement of the member between the loaded and the unloading positions is a movement towards a rearward end of the vehicle and wherein the container is unloaded from the vehicle over said rearward end, and wherein, at or towards said rearward end of the vehicle, there are provided a pair of rollers which are so arranged that, in use, they engage and guide a container during loading and unloading movement of the container.

22. A mechanism according to claim 21 wherein the vehicle includes an extendable and retractable stabilizing jack provided at or towards the rearward end of the vehicle, which jack extends to engage the surface on which the vehicle stands as the container is loaded and unloaded to support the load-bearing surface of the vehicle during said movement.

* * * * *